(12) United States Patent
Beaver et al.

(10) Patent No.: US 12,731,097 B2
(45) Date of Patent: Sep. 8, 2026

(54) AUTOMATED AGENT PERFORMANCE RANKING ON KEY PERFORMANCE INDICATOR IMPACT FACTORS

(71) Applicant: Verint Americas Inc., Alpharetta, GA (US)

(72) Inventors: Ian Beaver, Chino Valley, AZ (US); Cynthia Freeman, Green Valley, AZ (US); Jose Benki, Ann Arbor, MI (US)

(73) Assignee: Verint Americas Inc., Alpharetta, GA (US)

( * ) Notice: Subject to any disclaimer, the term of this patent is extended or adjusted under 35 U.S.C. 154(b) by 40 days.

(21) Appl. No.: 18/626,819

(22) Filed: Apr. 4, 2024

(65) Prior Publication Data

US 2025/0315769 A1 Oct. 9, 2025

(51) Int. Cl.
*G06Q 10/00* (2026.01)
*G06Q 10/0639* (2023.01)

(52) U.S. Cl.
CPC . *G06Q 10/06398* (2013.01); *G06Q 10/06393* (2013.01)

(58) Field of Classification Search
None
See application file for complete search history.

(56) References Cited

U.S. PATENT DOCUMENTS 8,341,013 B2 * 12/2012 Lee .......................... G06Q 99/00 705/7.41
2002/0184069 A1 * 12/2002 Kosiba ............. G06Q 10/06315 705/7.38
2009/0204470 A1 * 8/2009 Weyl ....................... G06Q 10/06 705/7.13
2010/0318410 A1 * 12/2010 Lee ......................... G06Q 99/00 705/7.31
2012/0130771 A1 * 5/2012 Kannan .............. G06Q 30/0203 707/738

(Continued)

OTHER PUBLICATIONS

N Baldon (Time series forecast of call volume in call center using statistical and machine learning methods)—2019—diva-portal.org. (Year: 2019).*

(Continued)

*Primary Examiner* — Hafiz A Kassim
(74) *Attorney, Agent, or Firm* — Dinsmore & Shohl LLP

(57) ABSTRACT

A method for providing automated agent performance ranking includes obtaining, for each agent of a plurality of agents, a performance score for each feature associated with a plurality of customer-agent interactions, wherein each feature is associated with a key performance indicator (KPI) metric and is under control of the agent; determining a task label for each of the plurality of customer-agent interactions; grouping the plurality of customer-agent interactions into one or more task groups based on the task label for each of the plurality of customer-agent interactions; determining, for each agent of the plurality of agents, a task-feature performance value, wherein the task-feature performance value is a combination of the performance score for each feature associated with the one or more task groups; and generating, for each feature, a report comprising a ranking for each agent of the plurality of agents based on the task-feature performance value.

22 Claims, 9 Drawing Sheets

(56) References Cited

U.S. PATENT DOCUMENTS

2012/0300920 A1* 11/2012 Fagundes .............. H04M 3/523
379/265.05
2016/0162474 A1* 6/2016 Agarwal ................ G06Q 30/00
704/9
2018/0034966 A1* 2/2018 te Booij .............. H04M 3/5232
2018/0262618 A1* 9/2018 Stern ................... H04M 3/5175
2019/0138190 A1* 5/2019 Beaver .................... G06F 40/35
2019/0138918 A1* 5/2019 Spivack ................. G06N 5/022
2019/0182382 A1* 6/2019 Mazza .................. H04M 3/527
2019/0287004 A1* 9/2019 Bhoj ...................... G06N 3/006
2019/0340243 A1* 11/2019 Beaver .................... G06F 40/30
2019/0340684 A1* 11/2019 Belanger .................. G06N 3/08
2020/0057811 A1* 2/2020 Seegan ................. G06F 40/253
2020/0110805 A1* 4/2020 Beaver ................ G06F 3/04817
2020/0117858 A1* 4/2020 Freeman ............... G06F 40/117
2020/0250277 A1* 8/2020 Mallette .................. G06F 40/35
2021/0201237 A1* 7/2021 Boddu ............... G06Q 30/0269
2021/0232361 A1* 7/2021 Brown .................... G06F 3/167
2022/0027837 A1* 1/2022 D'Attilio ............ H04M 3/5175
2022/0092512 A1* 3/2022 Dhawan ........... G06Q 10/06398
2022/0374609 A1* 11/2022 Beaver .................... G06F 40/30
2024/0028999 A1* 1/2024 Muralikrishnan Vathsala .............
H04M 3/5175
2024/0211475 A1* 6/2024 Nagy .................... G06F 16/243
2025/0061290 A1* 2/2025 Gardner .................. H04L 51/04
2025/0131359 A1* 4/2025 Barrett .................... G06F 40/35

OTHER PUBLICATIONS

Rabaiei, Al K., et al., "Kano Model Integration with Data Mining to Predict Customer Satisfaction", Journal, BDDC, 2021, vol. 5, issue 4, No. 66, pp. 1-18. https://www.mdpi.com/2504-2289/5/4/66.

Auguste, Jeremy, et al., "Can We Predict Self-Reported Customer Satisfaction From Interactions?", 2019 IEEE International Conference on Acoustics, Speech and Signal Processing (ICASSP), May 2019, Brighton, United Kingdom. https://hal.science/hal-02439687/file/ICASSP_2019_author_version.pdf.

Cogito "The Cogito Experience Score" https://cogitocorp.com/resources/cogito-experience-score/ (Web Page Accessed Apr. 3, 2024).

Cogito "The Cogito Customer Experience Score" Brochure https://cogitocorp.com/wp-content/uploads/2020/12/Cogito-Customer-Experience-Score.pdf (Web Page Accessed Apr. 3, 2024).

* cited by examiner

AUTOMATED AGENT PERFORMANCE RANKING ON KEY PERFORMANCE INDICATOR IMPACT FACTORS

INTRODUCTION

Technical Field

The present disclosure relates to techniques for automating agent performance ranking.

Background

Customer support services are an obligatory aspect of providing customers services or goods. Customer support services provide a means for a consumer of a service or a good to correspond with a company providing the service or good. Consumers contact customer support services for a wide range of reasons. For example, consumers contact customer support service to make a change to the service, address an issue with the service or good, provide feedback to a company, seek information about a service or good, and many other reasons.

Customer support services typically consist of human operated contact centers that correspond with customers via voice call, video call, email, or chat. In addition to recording a conversational interaction (also referred to as a session) between a representative of the customer support service and the consumer, other metrics may be manually recorded by the representative, such as summarizing the interaction. For example, the representative, post-conversational interaction, may write up a brief summary of the interaction and submit it with the record of the interaction.

Companies providing services and goods and customer support service operators are increasingly interested in improving customer-agent interactions. To improve customer-agent interactions, companies currently rely on surveys generated by customers following the customer-agent interaction. The surveys can inform supervisors as to customer-based KPI metrics and performance of agents.

SUMMARY

One aspect provides a method for providing automated agent performance ranking includes obtaining, for each agent of a plurality of agents, a performance score for each feature associated with a plurality of customer-agent interactions, wherein each feature is associated with a key performance indicator (KPI) metric and is under control of the agent; determining a task label for each of the plurality of customer-agent interactions; grouping the plurality of customer-agent interactions into one or more task groups based on the task label for each of the plurality of customer-agent interactions; determining, for each agent of the plurality of agents, a task-feature performance value, wherein the task-feature performance value is a combination of the performance score for each feature associated with the one or more task groups; and generating, for each feature, a report comprising a ranking for each agent of the plurality of agents based on the task-feature performance value.

Another aspect provides, an apparatus configured for providing automated agent performance ranking, comprising: one or more memories comprising processor-executable instructions; and one or more processors configured to execute the processor-executable instructions and cause the apparatus to: obtain, for each agent of a plurality of agents, a performance score for each feature associated with a plurality of customer-agent interactions, wherein each feature is associated with a key performance indicator (KPI) metric and is under control of the agent; determine a task label for each of the plurality of customer-agent interactions; group the plurality of customer-agent interactions into one or more task groups based on the task label for each of the plurality of customer-agent interactions; determine, for each agent of the plurality of agents, a task-feature performance value, wherein the task-feature performance value is a combination of the performance score for each feature associated with the one or more task groups; and generate, for each feature, a report comprising a ranking for each agent of the plurality of agents based on the task-feature performance value.

These and additional features provided by the aspects described herein will be more fully understood in view of the following detailed description, in conjunction with the drawings.

DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

Figure 1:
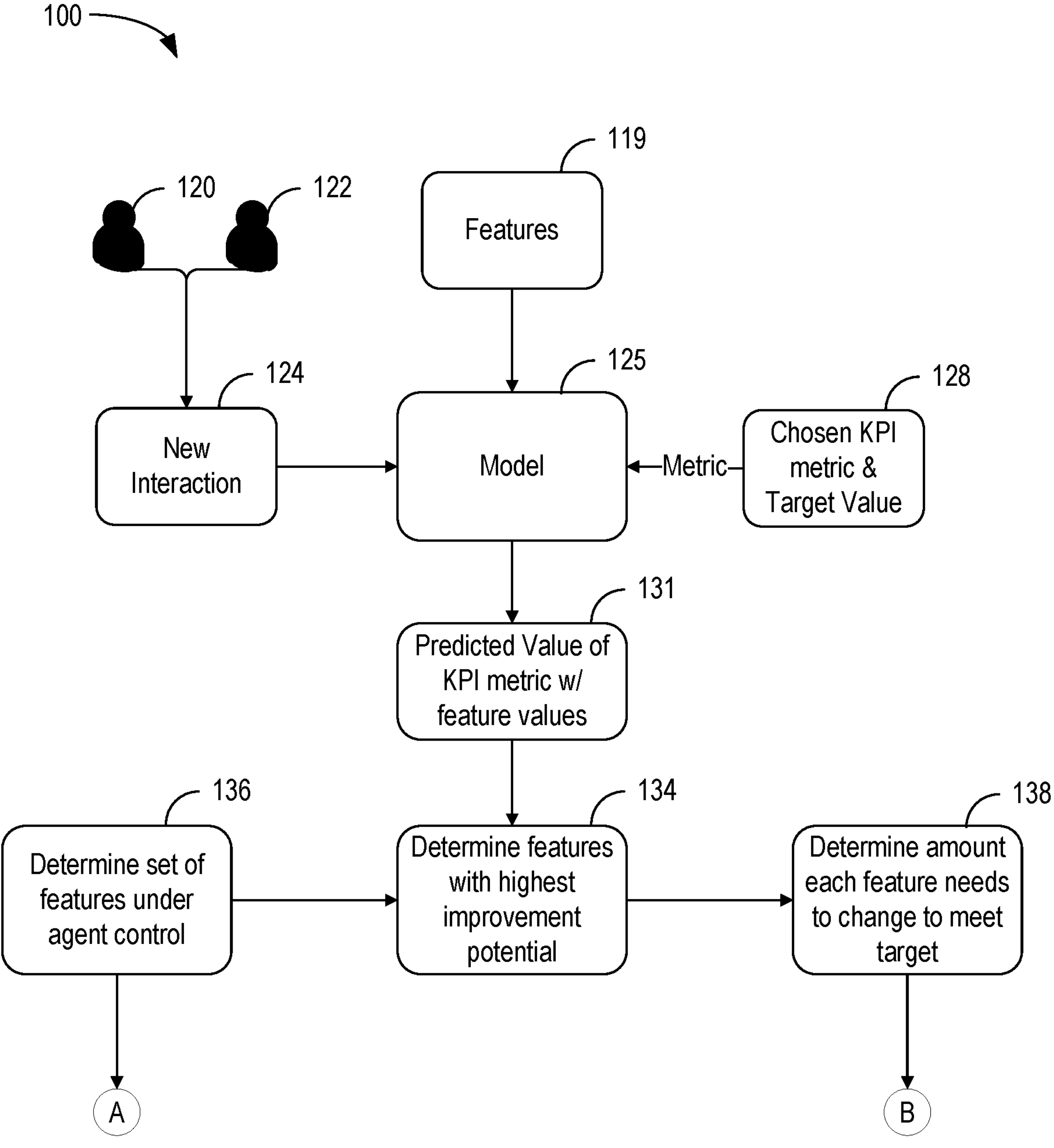
FIG. 1 schematically depicts an illustrative block diagram of a key performance indicator (KPI) prediction process.

Embodiments of the present disclosure are directed to techniques for automating agent performance rankings to provide reports and indications to supervisors and/or automated coaching systems. In some aspects, the automated agent performance rankings utilize features KPI prediction process to generate performance data otherwise unavailable due to the scarcity and nonspecific post interaction surveys. The automated agent performance ranking processes described herein provide techniques for analyzing historical interaction data and near-real time customer-agent interactions to develop agent performance scores based on features of a customer-agent interaction, the type or difficulty of task being performed, and generating reports regarding the performance. The reports include quantifiable performance information that a supervisor and/or automated coaching system can consume and generate responsive actions such as training modules or positive reinforcement for an agent. It should be understood that the term "agent" as discussed herein refers to either human agents or computer-driven bots, such as chatbots, unless specifically stated otherwise.

The techniques for described herein may be utilized on a variety of conversational interactions. For example, conversational interactions may arise from any type of interaction between two or more entities. The types of customer-agent interactions may include human-to-human interactions, human-to-chatbot interactions, or even chatbot-to-chatbot interactions. As used herein, chatbot refers to artificial intelligence-based engines configured to simulate human conversation through text, video, and/or voice. Chatbots may also be referred to herein as intelligent virtual agents (IVA). IVAs are chatbots that can engage with a human customer or another chatbot using understandable human speech. IVAs may be trained and refined based on interactions, but do not need to be specifically programmed to handle certain types of interactions. Instead, IVAs implement a combination of natural language processing (NLP), natural language understanding (NLU), machine learning, and generative and conversational artificial intelligence (AI) to recognize human speech, understand the intent behind it, and respond in a way that mimics human conversation. Through interactions, IVAs can increase their vocabulary, learn nuances of speech, such as the use of slang terms or acronyms, and adapt based on feedback from other entities they are interacting with and through directed training operations, such as supervised learning. The means in which the interactions may occur include, but are not limited to voice calls, video calls, emails, instant messages, and chats.

Mechanisms for recording conversational interactions exist. For example, a video or voice call may be recorded into a media file. In near real-time or at a later time, the media file can be transcribed into a text-based file converting at least audio aspects of the media into readable text. Text based conversational interactions can be recorded and stored as a text-based data file.

Companies offering services or goods to consumers or customer support services desire to utilize the recorded content from conversational interactions for a variety of purposes. For example, evaluation of the customer-agent interactions can provide insights regarding a customer's satisfaction or dissatisfaction through methods and apparatuses described herein. Currently, KPIs such as a customer satisfaction score are only obtainable through post interaction surveys, which historically have a low compliance rates and are generally limited in scope.

Since post interaction surveys are sparse and lack dense (e.g., detailed and numerous) insights for use in evaluating key performance metrics, the present disclosure provides systems, methods, and apparatuses for predicting KPIs from customer-agent interactions. As discussed in more detail herein, the KPI prediction and improvement processes enable the prediction of a value for a KPI metric, irrespective of the presence of a post interaction survey, and can further provide suggested agent-controllable features of a customer-agent interaction that can be improved to maintain or improve a KPI metric. The solutions provided in the present disclosure reduce or eliminate the need for post interaction surveys by providing technical solutions to identifying and measuring features present in customer-agent interactions to predict a KPI metric. KPI metrics include, but are not limited to, customer satisfaction scores (CSAT), customer churn rate (Churn), net promoter score (NPS), and the like. CSAT is a metric that indicates how satisfied customers are with a company's products or services. Churn is the percentage of customers who stop doing business with an organization over a period of time. NPS is a metric that quantifies customer loyalty by looking at their likelihood of recommending a given business.

Example features of a customer-agent interaction during a call, for example, include past average CSAT, Churn, NPS of an agent over a past period of time, the time an agent spends talking during the call with a customer, the time a customer spends talking during the call, the number of interruptions by the agent of the customer in the call, number of interruptions by the customer of the agent, time between an agent's hire date and the call date, call duration, number of holds in the call, the time of mutual silence in the call, number of words spoken by the agent, number of words spoken by the customer, agent speaking rate in word per minute, customer speaking rate in words per minute, number and duration of agent pauses, number and duration of customer pauses, number of conversational turns, the screen module used in the call, knowledge management (KM) searches conducted by the agent, customer relationship management (CRM) access patterns by the agent, survey variables and/or any other features that can be extracted from the customer-agent interaction.

A company, such as a contact center operator, may desire to maintain or improve one or more KPI metrics, but without a statistically significant number of post interaction surveys, the company is unable to effectively determine a value for the one or more KPI metrics and more significantly understand the features of the contact center operation, such as features of the customer-agent interaction that drive the KPI metric. The present disclosure provides solutions to this problem which include training classifier models, such as a gradient boosting classifier, random forest classifier, or other machine learning-based classifiers to analyze features of a customer-agent interaction and predict a value for the desired KPI metric.

The technical solutions described herein utilize data from multiple sources, for example, speech analytics (SA), KM, CRM, and the like along with defined features of a customer-agent interaction to train a classifier model to predict a KPI metric. The technical solutions further provide a process for identifying features of the customer-agent interaction that have a potential for improvement and providing a recommendation as to which features and the amount each of the features need to be improved to meet a target value for the KPI metric. That is, the technical solutions not only provide a prediction of KPI, but also give insight to the user on how they can improve specific, targeted areas of their contact center to meet their KPI goals.

The technical solutions for predicting a KPI metric from customer-agent interaction data provide the technical benefit of reducing or eliminating reliance on post interaction surveys and analysis thereof and improving how a company, such as a contact center operator, can maintain and improve KPI metrics that are relevant to their business.

Additionally, companies, such as a contact center operator, need to not only know whether current operations are meeting their KPI goals or not, but also what features and agents can be improved and trained in order to improve and maintain KPI goals. Technical solutions associated with providing automated agent performance ranking provide the technical benefit of automated processes for analysis and reporting of performance data into a digestible and actionable form in near real-time, which is not attainable through current processes. As described in more detail herein, the technical solutions provide techniques that dissect and analyze performance on an equal basis to derive reports that identify changes in performance of an agent, gaps in knowledge or skills of an agent, as well as ranking agents in groups based on specific tasks and skills (e.g., performance with respect to features that drive KPI metrics). The automated agent performance ranking processes can directly report on the agents change in performance over time for each feature impacting KPIs without the need to create review questions and evaluation rules. The automated agent performance ranking processes can also directly report on the highest and lowest performing agents on features under the agents control that have a direct statistical link to the client chosen KPI metrics.

As described in more detail herein, given feature data from multiple sources (SA, KM, CRM, etc.) and interaction surveys from experience management (XM) a classifier model is trained to predict a customer selected KPI supported by the survey such as CSAT, Churn, NPS, and the like. A subset of classifier features that are likely under the agents' control is determined. These are features that are expected to differ between a new, untrained agent and a mature, skilled agent.

For a new customer-agent interaction, the classifier predicts the KPI for the interaction and reports each feature's importance in making the prediction. The impactful features to the KPI prediction are selected and then filtered based on those under the agents' control. For each feature under the agents' control a historical performance graph for each agent (e.g., Employee ID) can be generated. The historical performance based on each task, to ensure an equal basis, is used to compare agent abilities and so that the ranking does not reflect differences in task. Differences in task may be associated with difficulty or type of task.

For each feature under agents' control the agents are ranked by historical performance. The rankings are reported to agent coaching applications, for example, in a highest to lowest agent rank based on historical performance.

Each agent's performance for each feature on the latest interaction(s) is compared to their own historical performance by applying an outlier detection process. If there is a significant drop in performance over any feature as determined by a threshold, an indication (e.g., an alert or report) is made to the agent coaching applications. The outlier detection process may further be configured to detect a decrease in performance over time.

Aspects Related to Predicting a KPI Metric

FIG. 1 depicts an illustrative block diagram 100 of a KPI prediction process for predicting a client chosen KPI metric is depicted. A customer 120 corresponds with an agent 122 through email, voice, text, chat or the like which are compiled as customer-agent interaction data. The KPI prediction process predicts a value for the KPI metric and provides an indication of one or more features that can maintain and/or improve the value of the KPI metric when the one or more features are improved. The KPI prediction process includes invoking a model 125 configured predict the value for the KPI metric based on a plurality of features that the classifier model identifies and measures from the customer-agent interaction data. More specifically, the model 125 is configured to ingest customer-agent interaction data from step 124, a feature set 119, and the KPI metric and target value for the KPI metric 128.

Based on the KPI metric selected by the client, the corresponding model 125 is either created, if one does not already exist, or is selected from a plurality of models. The selected model 125 generates a predicted value for the KPI metric specified by the client. The selected model 125 may be a classifier model or another type of machine learning model configured to perform as described herein. The model 125 predicts a value for the KPI metric based on a plurality of features that the classifier model identifies and measures from the customer-agent interaction data. Additionally, the model 125 generates a score for each feature associated with the KPI metric. Each feature score corresponds to an agent's performance with respect to the feature during the customer-agent interaction. The model 125 then outputs the predicted value 131 for further utilization by the system executing the KPI prediction process or by another system or application, such as an agent coaching application or a performance ranking application.

At step 134, features with a potential for improvement are determined. Before determinations at step 134 and step 138 are carried out, step 136 provides one or more sets of predefined features that are determined to be controllable by an agent, such as a human agent, a chatbot, or both, when engaged in a customer-agent interaction. For example, some features that are under the control of a human agent include, but are not limited to, the time an agent spends talking during a call with a customer, the number of interruptions by an agent in the call, a call duration, a number of holds in the call, the time of mutual silence in the call, the screen module used in the call, KM searches conducted by the agent, CRM access patterns by the agent, length of employment, position or title information, and the like. The aforementioned features may also apply to a chatbot. However, some of the aforementioned features would not apply to a chatbot, such as the screen module used in the call, length of employment, and position or title information. Additionally, there may be some features that apply to a chatbot that may not apply to a human agent, for example, a quantity of out-of-vocabulary inputs or a per response feedback score, such as a thumbs-up or thumbs-down, or ranking out of 5 points. While many features may apply to both human agents and chatbot, how a feature of the one or more sets of predefined features is quantified or defined may need to be refined. For example, the feature for time a human agent spent talking on call may be determined to correspond to the amount of time a chatbot spent generating a response to an input.

At step 136, the KPI prediction process may determine a type of flag to set for each of the one or more features in the set of predefined features. The type of flag may indicate whether the feature is under the control of a human agent, a chatbot, or both. In some instances, the KPI prediction process, at step 136, may indicate with a flag as to which of the features from the set of predefined features is applicable to the customer-agent interaction being analyzed based on whether the agent is a human agent or a chatbot.

Accordingly, the determinations at step 134 are based only on features that are controllable by the agent. Without limiting the determinations at step 134 and step 138 to features that are controllable by the agent, suggestions for potential improvements to increase the KPI metric may be ones that the client cannot implement as they are outside of their control, such as the time a customer spends talking during the call, time between an agent's hire date and the call date.

At step 134, for example, the system is configured to determine, from the plurality of features that the classifier model identifies and measures from the customer-agent interaction data, at least one feature with a potential for improvement such that when the at least one feature is improved, the value predicted for the KPI metric increases.

Moreover, still at step 134, the in some aspects the system is configured to determine, from the plurality of features that the classifier model identifies and measures from the customer-agent interaction data, a feature with a highest improvement potential whereby improving the feature increases the value predicted for the KPI metric. For example, the model may identify the presence of features such as interruptions by the agent, mutual silence in a call, call duration, agent talk time and customer talk time within the customer-agent interaction data. The model may further quantify (e.g., measure) each of the features and determine a measured value for each which is also referred to herein as a feature value. Based on each of the measure values, the system may determine which of the features has room for improvement. This determination may take into account positively viewed feature values for the corresponding feature and compare them to the measured value to determine if there is room for improvement. For example, a positively viewed number of interruptions may be zero and a positively viewed percentage of agent talk time may be 50% or less. The difference between the measured values and the positively viewed feature values can provide an indication as to whether there is potential for improvement with respect to the feature. It is understood that this merely one example of determining whether a feature has a potential for improvement.

In similar aspects, a ranking of features may be determined. For example, the features may be ranked in a ranked list based on a margin available to improve that feature. The features may be ranked in a second ranked list based on the amount of change that an improvement to each feature would have on the KPI metric.

At step 138, an amount of change for each feature is determined. The amount of change indicates the amount each feature needs to change in order for the KPI metric to meet or exceed the target value. There may be multiple combinations of features and respective improvement amounts that will result in the KPI metric meeting or exceeding the target value. Accordingly, in some aspects, a matrix of features and respective amounts of change may be generated and/or output. Based on the determinations made at step 134 and step 138 a client receives actionable information that may lead to improvements in their KPI metric. For example, in some aspects, the system performing the KPI prediction process is configured to determine one or more features with a potential for improvement such that when the one or more features are improved, the value predicted for the KPI metric increases. The system may be further configured to determine an amount that each of the one or more features need to improve such that the value predicted for the KPI metric meets the target value and output a report indicating the value predicted for the KPI metric, the one or more features with the potential to improve, and the amount that each of the one or more features need to improve.

If it is determined that the value predicted for the KPI metric does not meet the target value, "No" at step 132, then the process continues to step 140, depicted and described with reference to FIG. 2.

Figure 2:
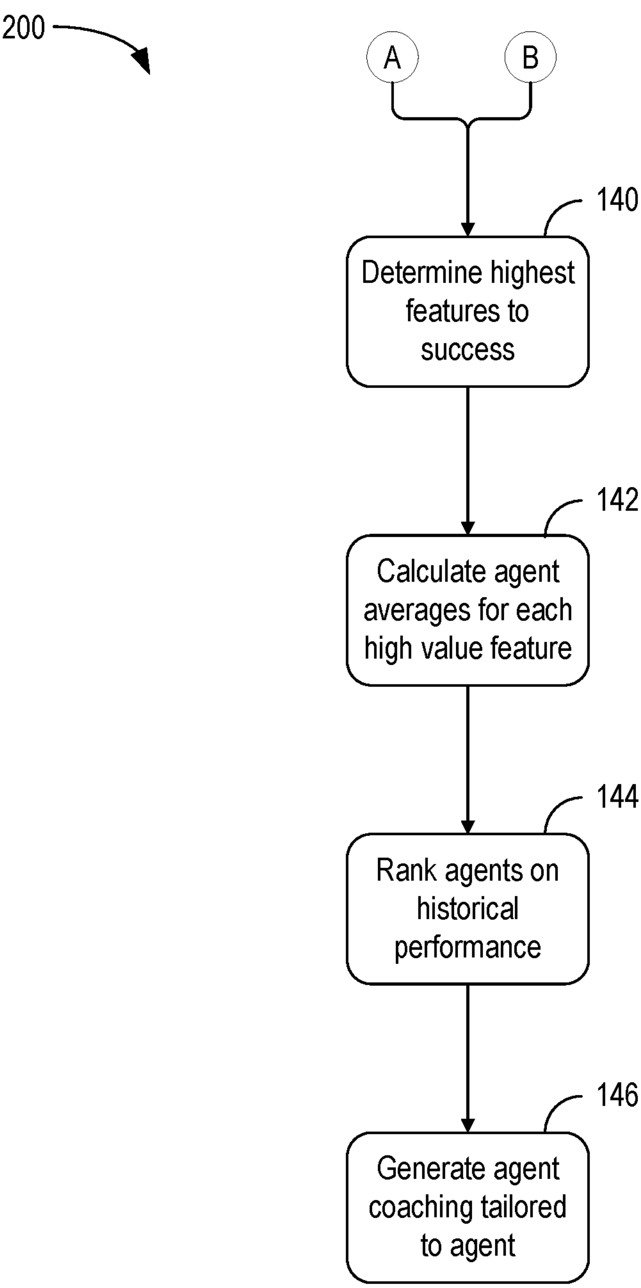
FIG. 2 schematically depicts an illustrative block diagram of a KPI improvement process.

FIG. 2 depicts an illustrative block diagram 200 that is an extension of the illustrative block diagram 100 of the KPI prediction process shown in FIG. 1. More specifically, the illustrative block diagram 200 depicts aspects of the KPI improvement process. The following process provides steps for determining which features drive the highest success in achieving or exceeding the target value for the KPI metric (step 140), calculating agents' performance average for each feature that drives high success (step 142), ranking the agents based on historical performance (step 144), and generating tailored coaching for the agents (step 146).

Inputs to the KPI improvement process depicted in illustrative block diagram 200 include the determination as to whether the value predicted for the KPI metric meets the target value from step 132, a set of predefined features controllable by the agent from step 136, and the amount of change each feature needs to change to meet or exceed the target value for the KPI metric from step 138.

At step 140, the features that drive the highest success or positive increase in the KPI metric are determined from the features that are controllable by the agent. For example, the features are ranked from the most positive impacting feature to the least positive impacting feature. The most positive impacting feature is a feature where the smallest amount of change in feature value (e.g., the measured value of the feature) results in the largest change in value for the KPI metric. For example, if reducing the amount of interruptions by an agent in a call by 10% results in a 50% increase in the KPI metric whereas reducing the amount of mutual silence in a call by 20% results in a 50% increase in the KPI, then the feature of the amount of interruptions by the agent in the call would be the most positive impacting feature. In other words, a smaller improvement would be needed to the feature of the amount of interruptions by the agent than the amount of mutual silence in the call to generate an equal improvement in the KPI metric.

At step 142, each agent's 122 average performance with respect to the features (e.g., the top 5%, top 10%, top 50% of the features) is calculated. In some aspects, the average performance of each agent is calculated for some or all of the features. The features the agent is evaluated on are at least the features corresponding to the set of predefined features controllable by the agent. Additionally, at step 144, the agents are ranked based on their calculated averages and/or their historical performance.

At step 146, coaching specific to improving features of an agent's interactions with a customer is generated such as training or refreshers that are relevant to the agents. Furthermore, tailored coaching provides a technical benefit of providing efficient and effective training that directly relates to improvement potential for the agent.

Figure 3:
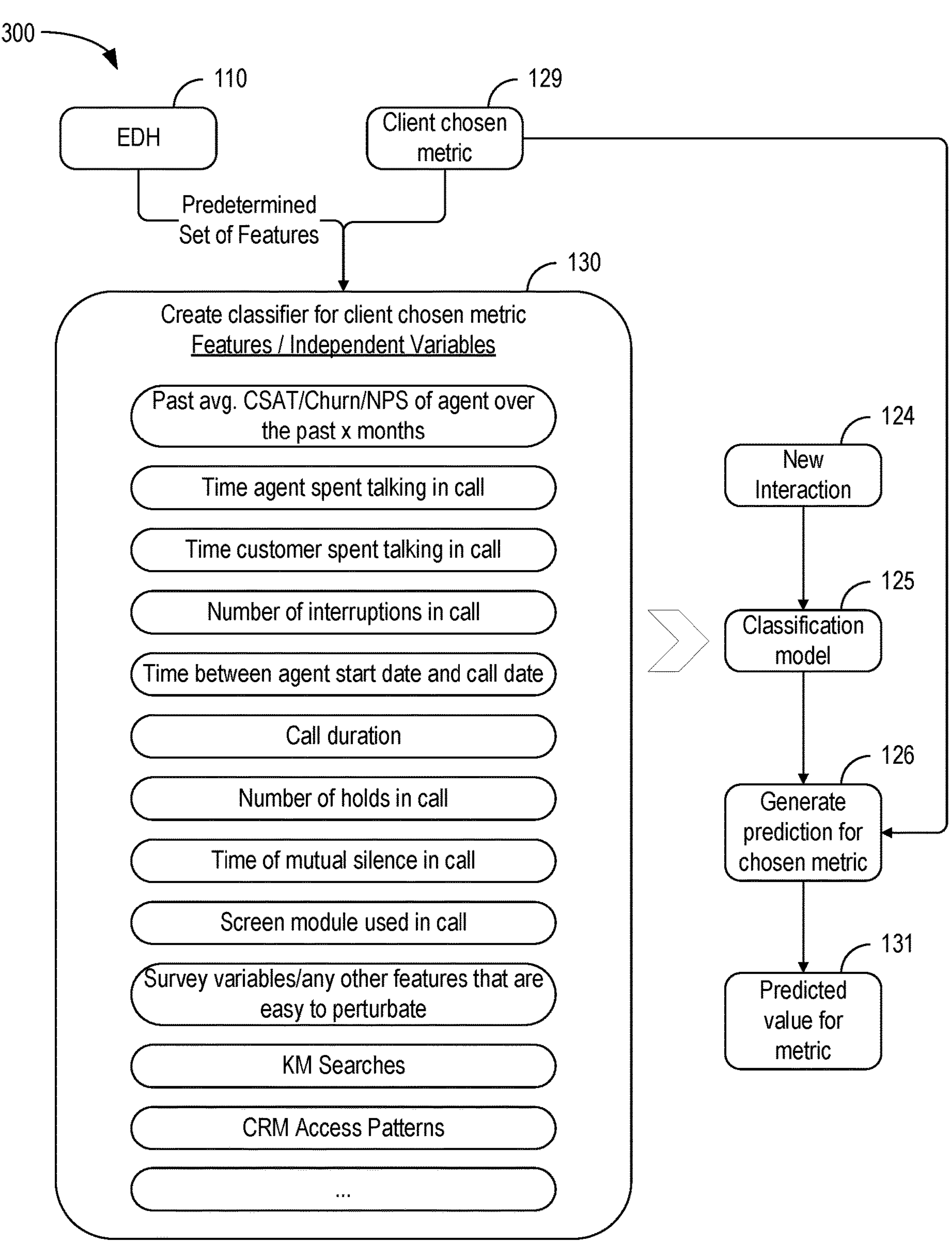
FIG. 3 schematically depicts an illustrative block diagram for creating a classifier model for the KPI prediction process.

FIG. 3 depicts an illustrative block diagram 300 for creating a classifier model for the KPI prediction process. The block diagram 300 corresponds to the steps depicted in the block diagram 100 of FIG. 1 however, some steps are depicted in additional detail. For concise explanation, repetition of steps previously described will be omitted here. At step 130, the model 125 corresponding to the client's selected KPI metric is created (or selected, if already created). Here, step 130 is expanded to illustrate example features utilized for training the model 125 and features that are considered by the trained version of the model. For example, example features include past average CSAT, Churn, NPS of an agent over a past period of time, the time an agent spends talking during a call with a customer, the time a customer spends talking during the call, the number of interruptions in the call, time between an agent's start data and the call data, a call duration, a number of holds in the call, the time of mutual silence in the call, the screen module used in the call, KM searches conducted by the agent, CRM access patterns by the agent, survey variables and/or any other features that can be ascertained from the customer-agent interaction.

The features can be a mix of agent behaviors such as number of holds or environmental features such as the screen module used to make the call. Once the model 125 is trained, every time a new interaction occurs at step 124, the interaction data can be fed to the model 125 to generate (e.g., at step 126) the predicted value 131 for the target value for the KPI metric. As discussed with reference to FIG. 1, if the model's prediction is below a target value, the process proceeds with determining which features need to be improved (e.g., at step 134) and by how much (e.g., at step 138) so target value for the KPI metric can be meet.

Figure 4:
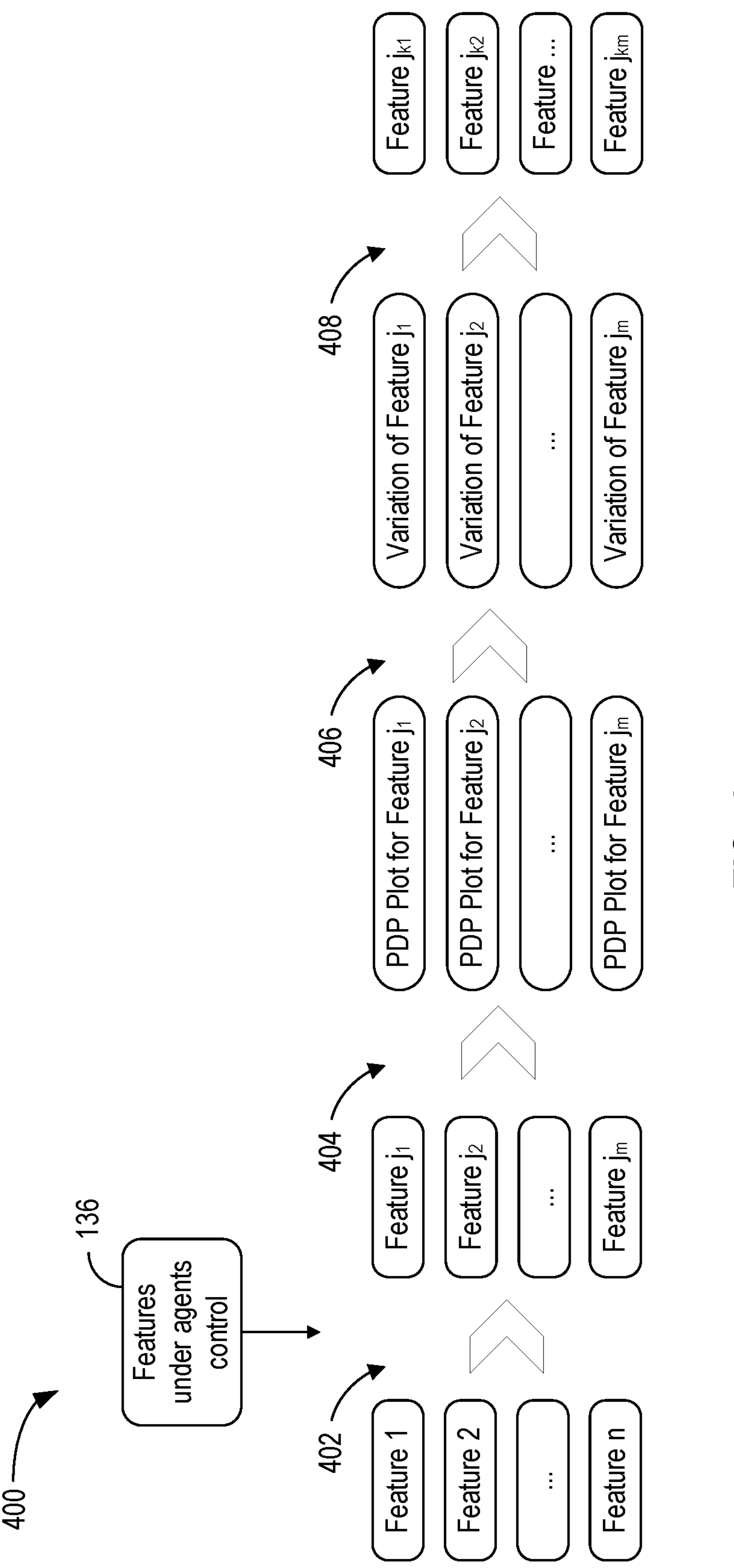
FIG. 4 depicts an illustrative diagram of a process for determining features with potential for improvement such that when improved increase the value predicted for the KPI.

FIG. 4 depicts an illustrative diagram 400 of a process for determining features that when improved, increase the value predicted for the KPI. For example, the process depicted in detail in FIG. 4 may be implemented with step 134 depicted and described with reference to FIG. 1.

Describing FIG. 4 left to right, there are n number of features/variables that can be defined in customer-agent interaction data. However, the feature space needs to be narrowed to those that are controllable by the contact center agent as offering suggestions to improve features outside of their control is not actionable. Accordingly, step 402 includes filtering out the features from the initial plurality of features (e.g., Feature 1, Feature 2, . . . , Feature n) that the contact center agent has no control over based on a set of predefined features determined to be in control of the agent. A filtered set of features (Feature $j_1$, Feature $j_2$, . . . , Feature $j_m$) includes a subset of the initial plurality of n features.

Next at step 404, partial dependence plots (PDP) for each of the filtered set of features is created. The partial dependence plots define a relationship between a change to a feature value and a probability of changing the KPI metric. For example, the x-axis of the PDP is changing the feature value. The y-axis of the PDP shows how much the prediction probability for the class (target KPI metric) changes. Therefore, the system can directly determine from the range of y in the PDPs the variations in predictive probability by changing the feature value.

Step 406 includes utilizing the PDPs to determine variations in the predictive probability of the feature value. That is, step 406 determines the amount that a feature has to change so that the KPI metric meets the target value. It is noted that the amount a feature has to change may depend on changes made by other features. Accordingly, in some aspects, the process at step 406 considers feature value changes of other features in combination with an amount of change to feature value of a present feature. In other words, other features may bring the KPI metric close to the target value thus leaving a smaller gap that needs to be closed by a present feature (e.g., a secondary feature).

At step 408, features are sorted (high to low) based on the size of the potential improvement by ranking the variations. The larger the variation, the more room for improvement a feature is determined to be capable of providing.

Aspects Related to Automating Agent Performance Ranking

Figure 5:
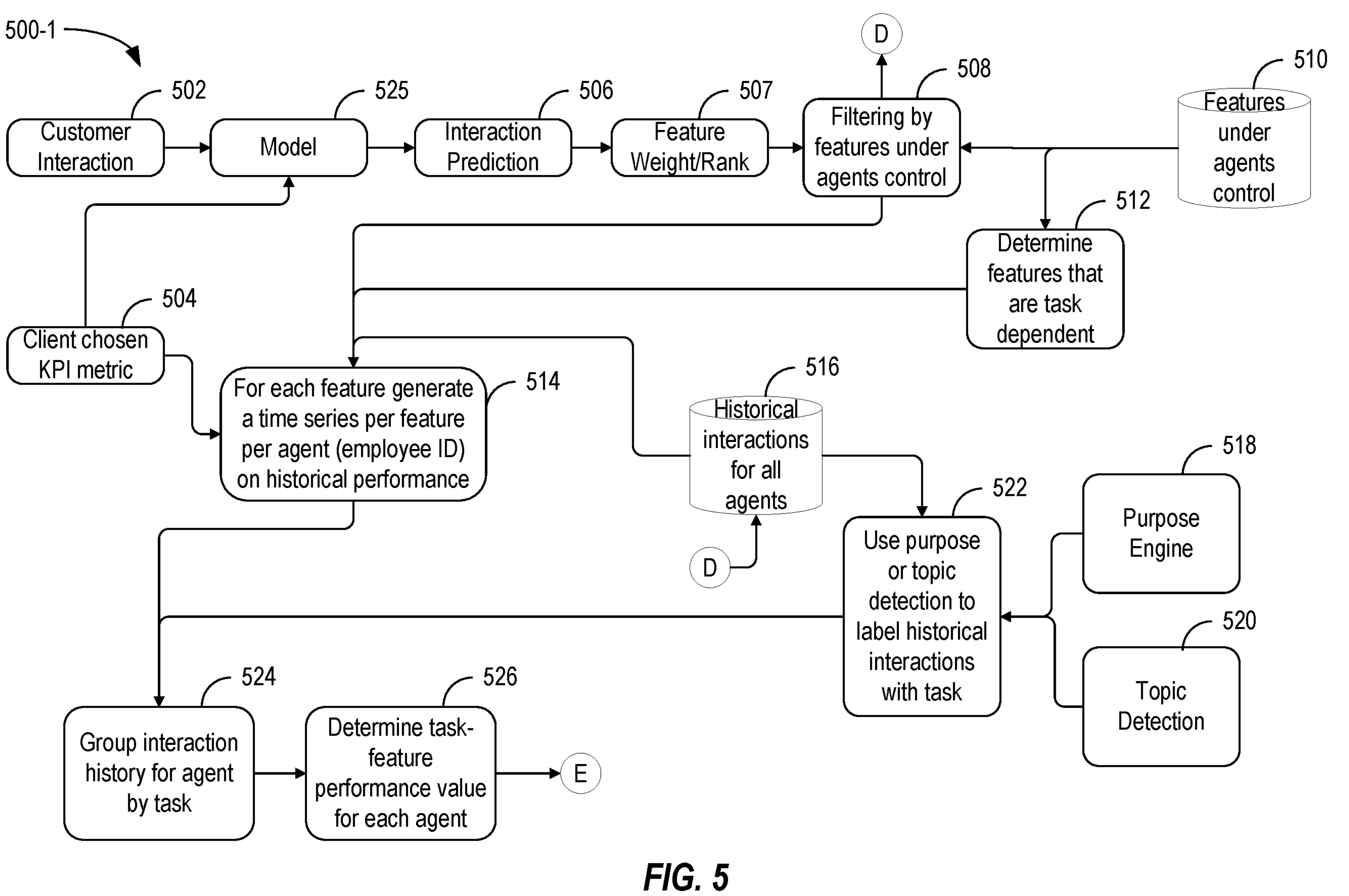
FIG. 5 schematically depicts an illustrative block diagram of an automated agent performance ranking process.
Figure 6:
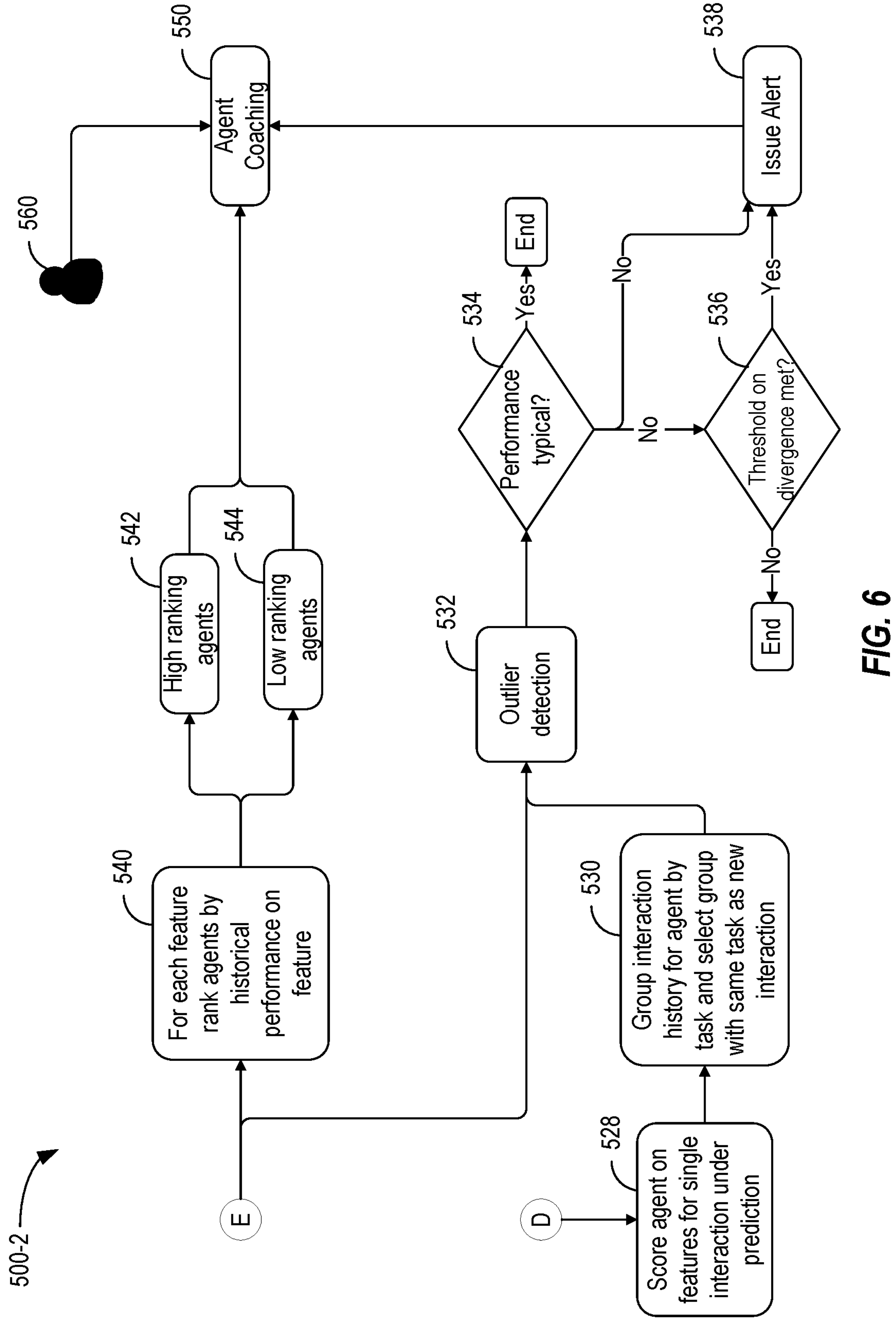
FIG. 6 continues to depict the illustrative block diagram of the automated agent performance ranking process depicted in FIG. 5.

FIGS. 5 and 6 depict illustrative block diagrams 500-1 and 500-2 corresponding to an automated agent performance ranking process.

For concise explanation, repetition of steps previously described will be not be repeated here. That is, step 502 corresponds to step 124 depicted and described with reference to at least FIG. 1. Step 504 corresponds to step 128 depicted and described with reference to at least FIG. 1. For example, the model 525 corresponds to step 126 and the model 125 depicted and described with reference to at least FIG. 1. Step 506 corresponds to the predicted value 131 depicted and described with reference to at least FIG. 1. Step 507 corresponds to steps 402-408 depicted and described with reference to at least FIG. 4. Step 508 and step 510 corresponds to step 134 and step 136, respectively, depicted and described with reference to at least FIG. 1.

As the aforementioned steps correspond to aspects and operations previously described, discussion herein begins with step 512. At step 512, a set of features that are determined to be controllable by an agent when engaged in a customer-agent interaction is received from step 510. The features that are determined to be controllable by the agent are further identified as being task-dependent, and if task-dependent correlated with the specific task. For example, interaction with a specific application by an agent to address an issue, such as resetting a password or processing a payment on an account may be specific to the respective tasks of password reset and payment processing tasks.

At step 514, the automated agent performance ranking process receives a KPI metric that is chosen by a user (e.g., from step 504), a filtered set of features corresponding to those that are under an agent's control (e.g., from step 508), a list of features that are task dependent (e.g., from step 512), and historical interactions for a plurality of agents (e.g., from step 516). The historical interactions for a plurality of agents, from step 516, include customer-agent interaction data for a plurality of agents over a period of time. In some instances, the historical interactions do not include performance scores or other analytics. Rather, the historical interactions need to be analyzed, for example, by the model 525 (e.g., corresponding to model 125 depicted and described with reference to FIGS. 1-4), at step 514 to obtain a performance score for each feature in a plurality of customer-agent interactions. Accordingly, at step 514, the automated agent performance ranking process obtains, for each agent of a plurality of agents, a performance score for each feature in a plurality of customer-agent interactions provided in the historical interactions.

Step 514, in some aspects, generates a times series of an agent's performance per feature associated with a customer-agent interaction. Additionally, each feature is associated with a key performance indicator (KPI) metric and is under control of the agent. For example, the time series may be defined by predefined intervals of time and performance scores corresponding to features for interactions occurring during each predefined interval of time. The time series is initially generated as a data structure such as an array or a matrix. For example, each agent of the plurality of agents may have multiple time series. Each time series may be feature and/or task specific. However, visually, the time series provides a visual representation of performance, for example, depicted on a Y-axis of a graph with time defined on the X-axis. Whether the time series is produced as a visual representation or remains as a data structure for processes of the automated agent performance ranking process to utilize, trends, averages, and other statistical analysis can be performed to analyze performance of an agent over time.

For example, one of the plurality of customer-agent interactions may be a transcript of an interaction between a customer communicating with an agent at a contact center to have a password reset for one of their accounts. The customer-agent interaction may include one or more of the following quantifiable features: the time an agent spends talking during a call with a customer, the time a customer spends talking during the call, the number of interruptions in the call, time between an agent's start data and the call date, a call duration, a number of holds in the call, the time of mutual silence in the call, the screen module used in the call, KM searches conducted by the agent, CRM access patterns by the agent, or the like. The model 525 identifies and measures each feature to generate a predicted value for a KPI metric corresponding to the interaction. The model 525, also generates a performance score for each of the features in the customer-agent interaction.

Another example interaction may include a customer communicating with an agent at the contact center to make changes to beneficiary information on life insurance plan. The type of task can be determined at step 522 with a purpose engine 518 or a topic detection engine 520. The purpose engine 518 invokes a process configured to ingest a transcript of an interaction and generate a predicted intent or purpose of the interaction. For example, the purpose engine 518 may include an artificial intelligence based intent discovery model that is configured to ingest a transcript of an interaction and generate a predicted intent or purpose of the interaction. An example aspect of the intent discovery model is described in U.S. patent application Ser. No. 18/438,381, which is incorporated herein by reference in its entirety.

In some aspects, the type of task can be determined at step 522 with a topic detection engine 520 that employs natural language processing techniques to automatically extract meaning from text by identifying themes or topics. Step 522 may process and determine the purpose or topic in each of a plurality of customer-agent interactions provided in the historical interactions from step 516. Additionally, at step 522, a task label is assigned to each of the plurality of customer-agent interactions. In some aspects, the task label is the task type. In other aspects, the task label is a difficulty metric of the task. While, in yet other aspects, the task label comprises both a task type and a difficulty metric. The difficulty metric may be generated from a predefined rating assigned to each type of task.

Step 524 includes receiving performance scores for each of the plurality of agents from step 514 and task labels for each of the plurality of customer-agent interactions from step 522. Step 524 executes a process for grouping interaction history (e.g., the performance scores for each feature) for each agent based on the task label. That is, performance scores for each feature identified in the plurality of customer-agent interactions are grouped into one or more task groups based on the task label for each of the plurality of customer-agent interactions. The one or more task groups may be associated with a type of task, such as account access issues including resetting a password or billing including processing a payment on an account. The one or more task groups may be associated with a task difficulty metric. The aforementioned process of grouping may also be applied to grouping time series in the same manner, when time series per feature are provided by step 514 to step 524. For example, step 524 may execute a process for grouping each of the generated time series into the one or more task groups based on the task label for each of the plurality of customer-agent interactions.

With the plurality of customer-agent interactions grouped by task in step 524, step 526 determines a task-feature performance value for each agent of the plurality of agents. As used herein, the term "task-feature performance value" refers to a combination of the performance scores specific to a particular feature and the task identified by the grouping in step 524. For example, a task-feature performance value for a feature such as mutual silence during the task of a password reset may be determined from a combination of performance scores for a specified agent's history of engaging in the task of password reset and the corresponding features of mutual silence. The task-feature performance value may be a statistically determined value from the combination of performance scores or a time series of the performance scores for each task and feature combination.

In combination with determining that the feature of mutual silence is a highly impactful feature to a value for the KPI metric, insight into an agent's task and feature specific performance provides additional specificity into whether an agent's performance, good or poor, is driven more by the task, feature, or a combination of both. That is, determining the agent's performance with respect to specific features during the task specific activities helps identify whether there is a need for training on that feature, task, or combination. For example, if an agent's performance with respect to mutual silence is poor for a specific task, it is more likely that there is a need for training more geared towards the task rather than how to conduct a conversation with a customer to avoid negative instances of mutual silence.

At step 540, reports are generated ranking the agents based on their historical performance by features. Step 540 executes a process for generating, for each feature, a report comprising a ranking for each agent of the plurality of agents based on the task-feature performance value. For example, the report may include a listing of high-ranking agents 542 and a listing of low-ranking agents 544. In some aspects, the report comprises the time series for each agent of the plurality of agent. Ranking of the agents may include grouping agents into two or more groups. The groups may be associated with one or more threshold values, percentages, and/or total number of agents per grouping, such as agents having a task-feature performance value of better than 9 (out of 10), top and bottom 50%, top 10, 20, 30 or 40 agents per group or the like.

In some aspects, ranking of agents may include ranking human agents with other human agents and/or ranking human agents with one or more chatbot agents. In some aspects, to rank a group of agents that includes human agents and chatbot agents, features that are only relevant to chatbots may not be considered, unless the feature that is relevant to the chatbot can map to a corresponding human agent feature. For example, the human agent feature of the time a human agent spends talking on call may be considered equivalent to the chatbot agent feature of the amount of time a chatbot spent generating a response to an input. However, there may be instances where the feature value of the human agent feature and the chatbot agent feature, such as time in the aforementioned example, needs to be normalized in order to be compared for ranking the human agent and chatbot agent based on corresponding, but not exact same type of feature. The process of determining which features are relevant to human agents (e.g., controllable by human agents) and relevant to chatbot (e.g., associated with chatbots), may be determined based on the type of flag that is set in step 136 described with reference to FIG. 1 or step 510 as described with reference to FIG. 5.

The generated reports may be provided to an agent coaching application at step 550, where customized agent coaching is automatically generated and implemented, for example, absent the need for analysis and/or direction of a supervisor 560.

Still referring to the illustrative block diagrams 500-1 and 500-2 corresponding to an automated agent performance ranking process depicted in FIGS. 5 and 6, steps 528-538 provide a process for determining whether the performance of an agent is atypical from past performance and more specifically, whether their performance is trending in a negative direction. At step 528, the automated agent performance ranking process is configured to perform a process of generating, for a first agent of the plurality of agents, with a model 525 (e.g., a classifier model), a predicted performance score for each feature in the new customer-agent interaction. The model 125 may be as depicted and described with reference to FIG. 1, which may be configured to predict a value for the KPI metric and measure performance of features in a new customer-agent interaction.

Step 530 then groups interaction history for the agent by task and selects a group of the one or more task groups that corresponds to the task present in the new customer-agent interaction. The automated agent performance ranking process is configured to perform a process of associating the new customer-agent interaction with a corresponding one of the one or more task groups. The automated agent performance ranking process at step 530 is further configured to perform a process of selecting, from the corresponding one of the one or more task groups, the task-feature performance value associated with the first agent.

At step 532, an outlier detection process is applied based on the task-feature performance value for each agent of the plurality of agents determined at step 526 and the task group selection made at step 530. The outlier detection process includes comparing the predicted performance score for each feature in the new customer-agent interaction with the task-feature performance value for the corresponding one of the one or more task groups associated with the first agent. The comparison process generates a quantitative measure for further determining whether the agent's performance is typical and whether the agent's performance is trending in a negative direction.

As such, at step 534, the automated agent performance ranking process is configured to perform a process of determining, based on the comparison, whether the predicted performance score is within a predefined range of the task-feature performance value for the corresponding one of the one or more task groups associated with the first agent. If the predicted performance score is within a predefined range of the task-feature performance value, "Yes" at step 534, then no further action need be taken. However, if the predicted performance score is not within a predefined range of the task-feature performance value, "No" at step 534, then, in some aspects, the process proceeds to step 538, where the automated agent performance ranking process is configured to perform a process of outputting an indication that the predicted performance score is outside and below the predefined range. The indication may be an alert, a report, or a trigger which causes the agent coaching process at step 550 to be initiated.

In some aspects, if the predicted performance score is not within a predefined range of the task-feature performance value, "No" at step 534, then, the process proceeds to step 536, where the automated agent performance ranking process is configured to perform a process of determining whether the predicted performance score is part of a continuing trend of declining performance and the divergence in performance has met or exceeded a threshold performance value. To make the aforementioned determination, the automated agent performance ranking process may execute one or more intermediate processes. The one or more intermediate processes may include, obtaining, for the first agent, a time series of the task-feature performance value for the corresponding one of the one or more task groups.

Then, at step 536, a determination is made as to whether the predicted performance score indicates a continued decrease in performance based on the time series and the continued decrease meets or exceeds a divergence threshold. If the determination at step 536 concludes that the predicted performance score indicates a continued decrease in performance and meets or exceeds the divergence threshold, "Yes" at step 536, then the process proceeds to step 538, where the automated agent performance ranking process is configured to perform a process of outputting an indication. The indication may be an alert, a report, or a trigger which causes the agent coaching process at step 550 to be initiated.

If the determination at step 536 concludes that the predicted performance score does not indicate a continued decrease in performance and does not meet or exceed the divergence threshold, "No" at step 536, then then no further action may be taken.

Additional Aspects Related to Automating Agent Performance Ranking

Figure 7:
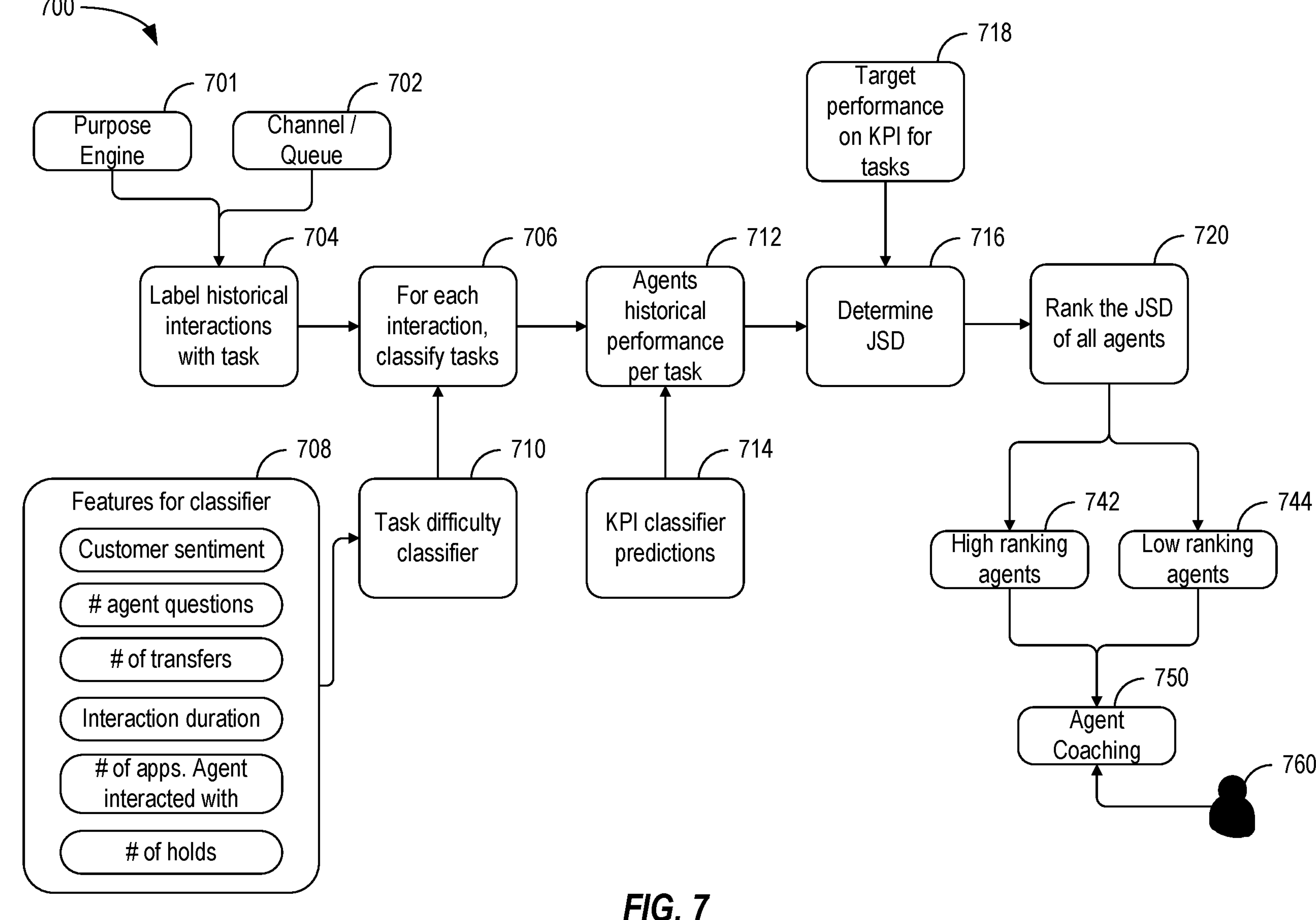
FIG. 7 schematically depicts another illustrative block diagram of an automated agent performance ranking process.

FIG. 7 depicts an illustrative block diagram 700 corresponding to another automated agent performance ranking process. More specifically, FIG. 7 depicts illustrative steps which may be implemented in place of or in conjunction with the processes described with reference to FIGS. 5 and 6 for generating agent performance ranking. In FIG. 7, Jensen-Shannon Divergence (JSD) is implemented along with a task difficulty metric as the basis for analyzing and comparing agent's performance.

The purpose engine 701 and the topic detection engine 702 correspond to the purpose engine 518 and the topic detection engine 520 as depicted and described with reference to FIG. 5, respectively. Similarly, step 704 corresponds to step 522 depicted and described with reference to FIG. 5. Step 704 generates a task label for each of the plurality of customer-agent interactions provided in the historical interaction information.

Step 706 uses the labeled tasks determined at step 704 to classify the tasks. Here, task classification is implemented to identify the label the tasks according to difficulty. Step 708 provides step 710 with features that are indicative of the difficulty of a task. Step 710 trains a task difficulty classifier based on the features from step 708. The task difficulty classifier, when trained, is configured to predict the difficulty of a task at step 706.

Step 712 receives predictions for the value of a KPI metric and performance scores for features corresponding to the customer-agent interactions generated by the model 525 executed at step 714. Step 712, similar to step 526 depicted and described with reference to FIG. 5, determines agents' performance per task. For example, the performance (e.g., a, b, c) for each task (e.g., task difficulty low "a", task difficulty medium "b", and task difficulty high "c") defined by a position in a vector is generated at step 712.

Step 718 provides step 716 with target performances on KPI for specific tasks. The target performances may be collected from a user such as a company operating a contact center. For example, the target performance per task may also be defined in vector format where position indicates the task and the value in the position indicates the target performance value. For example, a vector of (1, 1, 1,) may indicate that the target performance for task difficulty low "a" (first position), task difficulty medium "b" (second position), and task difficulty high "c" (third position), is perfection, where 0.9, 0.8, 0.7, and so forth may indicate less than perfect performance. It is noted that the scale of 0-1 provided herein is merely exemplary.

Step 716 determines that JSD between the performance vector (a, b, c) and the target performance vector (1, 1, 1).

The Jensen-Shannon divergence is a method of measuring the similarity between two probability distributions.

Step 720 performs a ranking operation where agents are ranked by their JSD. The ranking operation is based on the distance of the vector from (1,1,1). For example, the target performance vector (1,1,1) means perfect performance for easy, medium, and hard tasks. If there are two vectors or probability distributions A and B where A is closer to (1,1,1) than B, then A has a better ranking than B because A is closer to perfection.

The ranking operation may generate a report indicating the ranking of the agents. For example, the report may include a listing of high-ranking agents 742 and a listing of low-ranking agents 744. Ranking of the agents may include grouping agents into two or more groups. The groups may be associated with one or more threshold values, percentages, and/or total number of agents per grouping, such as agents having a task-feature performance value of better than 9 (out of 10), top and bottom 50%, top 10, 20, 30 or 40 agents per group or the like.

The generated reports may be provided to an agent coaching application at step 550, where customized agent coaching is automatically generated and implemented, for example, absent the need for analysis and/or direction of a supervisor 760.

Example Method for Providing an Automated Agent Performance Ranking

Figure 8:
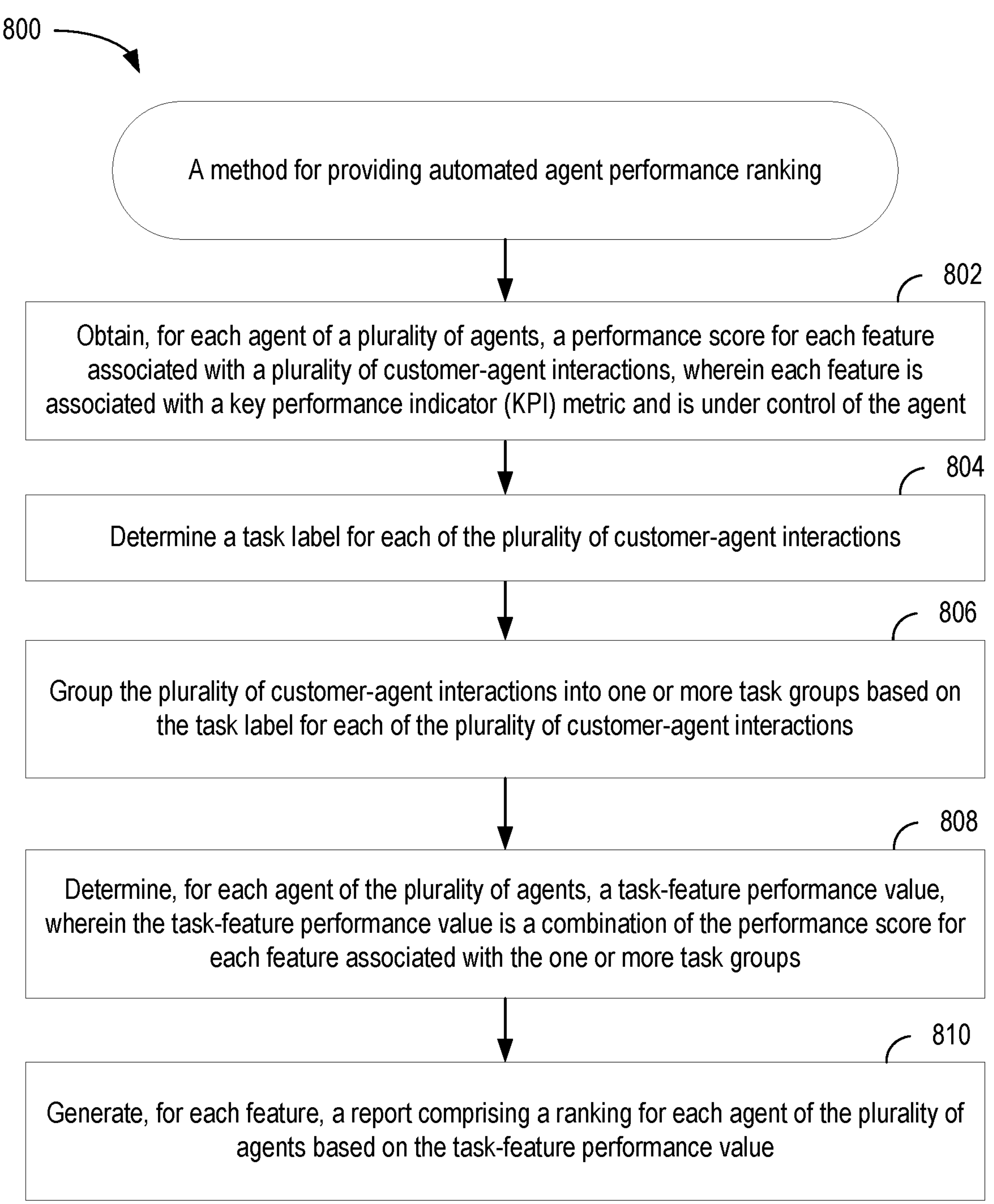
FIG. 8 depicts an illustrative flowchart for an example method for providing automated agent performance ranking.

FIG. 8 depicts an example method for providing an intent expressed in a conversational interaction in a narrative form.

In this example, method 800 begins at step 802 obtaining, for each agent of a plurality of agents, a performance score for each feature associated with a plurality of customer-agent interactions, wherein each feature is associated with a KPI metric and the feature is under control of the agent. For example, step 802 may be performed by the apparatus 900 as described herein with reference to FIG. 9 that is configured to perform at least the process corresponding to step 514 as described above with reference to at least FIG. 5.

Method 800 proceeds to step 804 with determining a task label for each of the plurality of customer-agent interactions. For example, step 804 may be performed by the apparatus 900 as described herein with reference to FIG. 9 that is configured to perform the process corresponding to step 522 as described above with reference to at least FIG. 5.

Method 800 proceeds to 806 with grouping the plurality of customer-agent interactions into one or more task groups based on the task label for each of the plurality of customer-agent interactions. For example, step 806 may be performed by the apparatus 900 as described herein with reference to FIG. 9 that is configured to perform the process corresponding to step 524 as described above with reference to at least FIG. 5.

Method 800 proceeds to 808 with determining, for each agent of the plurality of agents, a task-feature performance value, wherein the task-feature performance value is a combination of the performance score for each feature associated with the one or more task groups. For example, step 808 may be performed by the apparatus 900 as described herein with reference to FIG. 9 that is configured to perform the process corresponding to step 526 as described above with reference to at least FIG. 5.

Method 800 proceeds to 810 with generating, for each feature, a report comprising a ranking for each agent of the plurality of agents based on the task-feature performance value. For example, step 810 may be performed by the apparatus 900 as described herein with reference to FIG. 9 that is configured to perform the process corresponding to step 540 as described above with reference to at least FIG. 6.

In some aspects, the method 800 further includes generating, for each agent of the plurality of agents, a time series of the performance score for each feature in the plurality of customer-agent interactions; and grouping each of the generated time series into the one or more task groups based on the task label for each of the plurality of customer-agent interactions.

In some aspects, the method 800 further includes generating, for a first agent of the plurality of agents, with a classifier model configured to predict a value for the KPI metric and measure performance of features in a new customer-agent interaction, a predicted performance score for each feature in the new customer-agent interaction; associating the new customer-agent interaction with a corresponding one of the one or more task groups; selecting, from the corresponding one of the one or more task groups, the task-feature performance value associated with the first agent; comparing the predicted performance score for each feature in the new customer-agent interaction with the task-feature performance value for the corresponding one of the one or more task groups associated with the first agent; determining, based on the comparison, whether the predicted performance score is within a predefined range of the task-feature performance value for the corresponding one of the one or more task groups associated with the first agent; and outputting a first indication when the predicted performance score is outside and below the predefined range.

In some aspects, the method 800 further includes obtaining, for the first agent, a time series of the task-feature performance value for the corresponding one of the one or more task groups; determining that the predicted performance score indicates a continued decrease in performance based on the time series and the continued decrease meets or exceeds a divergence threshold; and outputting a second indication when the continued decrease meets or exceeds the divergence threshold.

Note that FIG. 8 is just one example of a method, and other methods including fewer, additional, or alternative steps are possible consistent with this disclosure. The method 800 enables direct reporting on the agents' change in performance over time for each feature impacting KPIs without the need to create review questions and evaluation rules. The automated agent performance ranking processes can also directly report on the highest and lowest performing agents on features under the agents control that have a direct statistical link to the client chosen KPI metrics. Based on the generated report, without the need for post interaction survey data, the method 800 provides contact centers with the improved ability to quantify performance of agents in near real-time so measures can be taken that near real-time or active feedback can be developed and provided instead of reactive or retroactive training measures which may have less of an impact on changing an agent's behavior.

Example Apparatus for Providing an Automated Agent Performance Ranking

Figure 9:
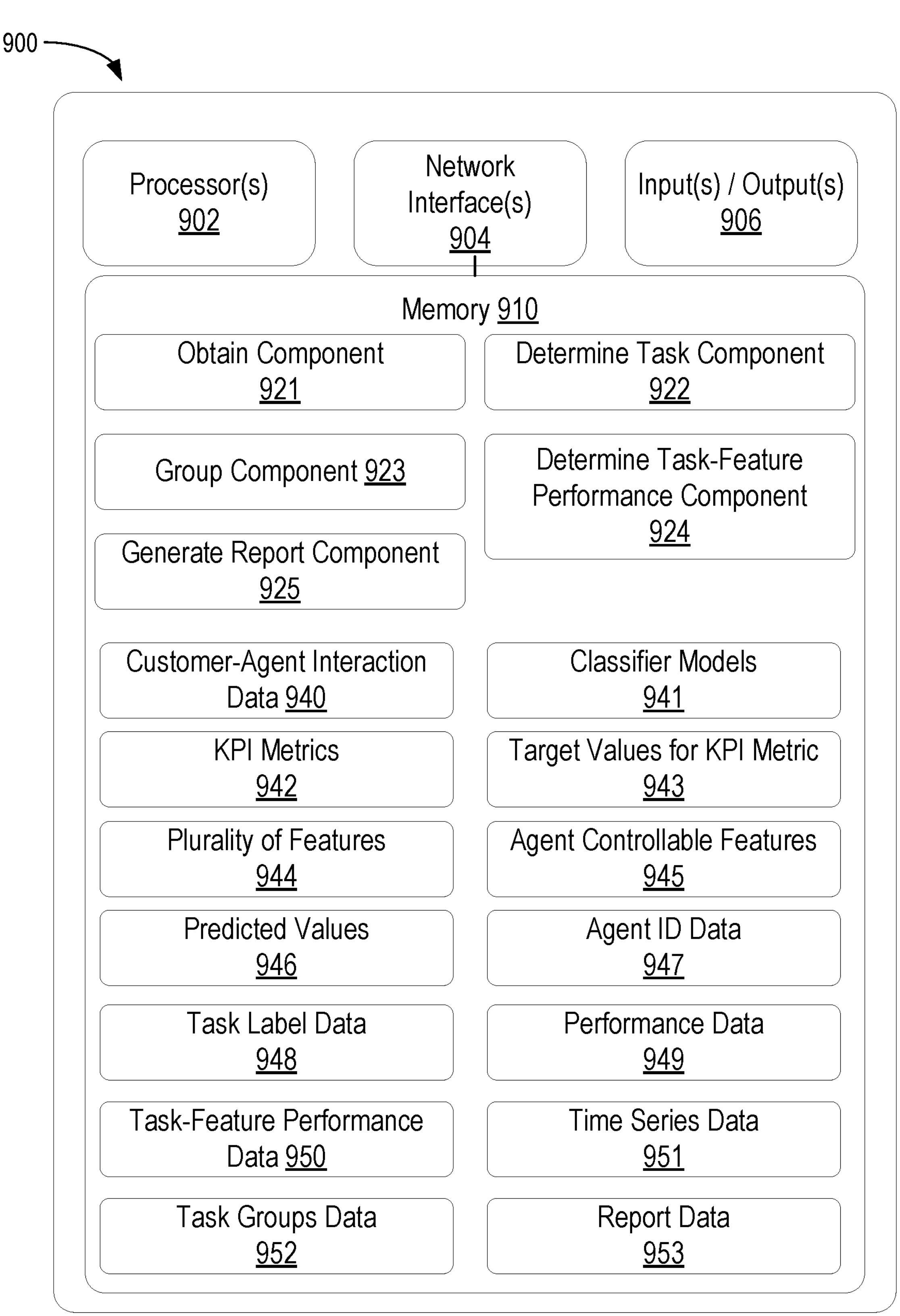
FIG. 9 schematically depicts an example apparatus for implementing the automated agent performance ranking process.

FIG. 9 depicts an example apparatus 900 configured to perform the methods described herein.

Apparatus 900 includes one or more processors 902. Generally, processor(s) 902 may be configured to execute computer-executable instructions (e.g., software code) to perform various functions, as described herein.

Apparatus 900 further includes a network interface(s) 904, which generally provides data access to any sort of data network, including personal area networks (PANs), local area networks (LANs), wide area networks (WANs), the Internet, and the like.

Apparatus 900 further includes input(s) and output(s) 906, which generally provide means for providing data to and from apparatus 900, such as via connection to computing device peripherals, including user interface peripherals.

Apparatus 900 further includes a memory 910 configured to store various types of components and data.

In this example, memory 910 includes an obtain component 921, a determine task component 922, a group component 923, a determine task-feature performance component 924, and a generate report component 925.

The obtain component 921 is configured to perform step 514 of the automated agent performance ranking process depicted and described with reference to FIG. 5 and step 802 of the method 800 depicted and described with reference to FIG. 8.

The determine task component 922 is configured to perform step 522 of the automated agent performance ranking process depicted and described with reference to FIG. 5 and step 804 of the method 800 depicted and described with reference to FIG. 8.

The group component 923 is configured to perform step 524 of the automated agent performance ranking process depicted and described with reference to FIG. 5 and step 806 of the method 800 depicted and described with reference to FIG. 8.

The determine task-feature performance component 924 is configured to perform step 526 of the automated agent performance ranking process depicted and described with reference to FIG. 5 and step 808 of the method 800 depicted and described with reference to FIG. 8.

The generate report component 925 is configured to perform step 540 of the automated agent performance ranking process depicted and described with reference to FIG. 5 and step 802 of the method 800 depicted and described with reference to FIG. 8.

In this example, memory 910 also includes at least the following, customer-agent interaction data 940, classifier models 941, KPI metrics 942, target value for KPI metric 943, plurality of features 944, agent controllable features 945, predicted values 946, agent ID data 947 corresponding to the plurality of agents, task label data 948, performance data 949, task-feature performance data 950, time series data 951, task group data 952, and report data 953 as described herein.

Apparatus 900 may be implemented in various ways. For example, apparatus 900 may be implemented within on-site, remote, or cloud-based processing equipment.

Apparatus 900 is just one example, and other configurations are possible. For example, in alternative embodiments, aspects described with respect to apparatus 900 may be omitted, added, or substituted for alternative aspects.

Example Clauses

Implementation examples are described in the following numbered clauses:

Clause 1: A method for providing automated agent performance ranking, comprising: obtaining, for each agent of a plurality of agents, a performance score for each feature associated with a plurality of customer-agent interactions, wherein each feature is associated with a key performance indicator (KPI) metric and is under control of the agent; determining a task label for each of the plurality of customer-agent interactions; grouping the plurality of customer-agent interactions into one or more task groups based on the task label for each of the plurality of customer-agent interactions; determining, for each agent of the plurality of agents, a task-feature performance value, wherein the task-feature performance value is a combination of the performance score for each feature associated with the one or more task groups; and generating, for each feature, a report comprising a ranking for each agent of the plurality of agents based on the task-feature performance value.

Clause 2: The method of Clause 1, further comprising: generating, for each agent of the plurality of agents, a time series of the performance scores for each feature associated with the plurality of customer-agent interactions; and wherein grouping the plurality of customer-agent interactions into one or more task groups comprises grouping each of the generated time series into the one or more task groups.

Clause 3: The method of Clause 2, wherein the report comprises the time series for each agent of the plurality of agents.

Clause 4: The method of any one of Clauses 1-3, wherein the task label for each of the plurality of customer-agent interactions is determined by at least one of a purpose engine comprising an artificial intelligence based intent discovery model or a topic detection engine.

Clause 5: The method of any one of Clauses 1-4, wherein the one or more task groups are associated with a type of task.

Clause 6: The method of any one of Clauses 1-5, wherein the one or more task groups are associated with a task difficulty metric.

Clause 7: The method of any one of Clauses 1-6, wherein obtaining the performance score for each feature associated with the plurality of customer-agent interactions comprises processing the plurality of customer-agent interactions with a model configured to measure performance of features in the plurality of customer-agent interactions.

Clause 8: The method of any one of Clauses 1-7, further comprising: generating, for a first agent of the plurality of agents, with a model, a predicted performance score for each feature in the new customer-agent interaction; associating the new customer-agent interaction with a corresponding one of the one or more task groups; selecting, from the corresponding one of the one or more task groups, the task-feature performance value associated with the first agent; comparing the predicted performance score for each feature in the new customer-agent interaction with the task-feature performance value for the corresponding one of the one or more task groups associated with the first agent; determining, based on the comparison, whether the predicted performance score is within a range of the task-feature performance value for the corresponding one of the one or more task groups associated with the first agent; and outputting a first indication when the predicted performance score is outside and below the range.

Clause 9: The method of Clause 8, wherein the first indication triggers an agent coaching process.

Clause 10: The method of Clause 8, further comprising obtaining, for the first agent, a time series of the task-feature performance value for the corresponding one of the one or more task groups; determining that the predicted performance score indicates a decrease in performance based on the time series and the decrease meets or exceeds a divergence threshold; and outputting a second indication when the decrease meets or exceeds the divergence threshold.

Clause 11: The method of any one of Clauses 1-10, wherein the report comprises at least two ranked groups of agents separated by one or more threshold task-feature performance values.

Clause 12: A processing system, comprising: a memory comprising computer-executable instructions; and a processor configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium comprising computer-executable instructions that, when executed by a processor of a processing system, cause the processing system to perform a method in accordance with any one of Clauses 1-11.

Clause 15: A computer program product embodied on a computer-readable storage medium comprising code for performing a method in accordance with any one of Clauses 1-11.

ADDITIONAL CONSIDERATIONS

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A method for providing automated agent performance ranking, comprising:

obtaining, for each agent of a plurality of agents, a performance score for each feature associated with a plurality of customer-agent interactions, wherein each feature is associated with a key performance indicator (KPI) metric and is under control of the agent;

determining task labels for the plurality of customer-agent interactions, wherein a task label for a customer-agent interaction of the plurality of customer-agent interactions is determined by:

detecting, with a large language model, a first intent from an interaction transcript and an engineered prompt of the customer-agent interaction;

generating, with the large language model, a first narrative for the first intent and a first confidence score corresponding to a probability that the intent is an intention in fact expressed in the interaction transcript;

determining that the first confidence score satisfies a threshold;

verifying that the first narrative conforms with one or more fluency and completeness rules based on a determination that the first confidence score satisfies the threshold;

updating the first narrative based on one or more modified hyperparameters of the large language model when the first narrative does not conform with the one or more fluency and completeness rules;

outputting the first narrative as the task label for the customer-agent interaction;

grouping the plurality of customer-agent interactions into one or more task groups based on the task label for each of the plurality of customer-agent interactions;

determining, for each agent of the plurality of agents, a task-feature performance value, wherein the task-feature performance value is a combination of the performance score for each feature associated with the one or more task groups;

obtaining, for a first agent of the plurality of agents, a time series of the task-feature performance value for a corresponding one of the one or more task groups;

determining that a predicted performance score for each feature in a new customer-agent interaction for the first agent indicates a decrease in performance based on a time series of the task-feature performance value for the corresponding one of the one or more task groups and the decrease in performance meets or exceeds a divergence threshold, and outputting an indication when the decrease in performance meets or exceeds the divergence threshold.

2. The method of claim 1, further comprising:

generating, for each agent of the plurality of agents, a time series of the performance scores for each feature associated with the plurality of customer-agent interactions; and wherein grouping the plurality of customer-agent interactions into one or more task groups comprises grouping each of the generated time series into the one or more task groups.

3. The method of claim 2, further comprising:

generating, for each feature associated with the plurality of customer-agent interactions, a report comprising a listing of high-ranking agents and a listing of low-ranking agents based on the task-feature performance value; and triggering, based on the report for each feature associated with the plurality of customer-agent interaction, an agent coaching process for one or more agents in the listing of low-ranking agents.

4. The method of claim 3, wherein the report further comprises the time series of the performance score for each agent of the plurality of agents.

5. The method of claim 1, wherein the one or more task groups are associated with at least one of a type of task or a task difficulty metric, and wherein the task difficulty metric is generated from a predefined rating assigned to each type of task.

6. The method of claim 1, wherein the one or more fluency and completeness rules comprises at least one of a grammar rule, a spelling rule, or a punctuation rule.

7. The method of claim 1, wherein obtaining the performance score for each feature associated with the plurality of customer-agent interactions comprises processing the plurality of customer-agent interactions with a model configured to measure performance of features in the plurality of customer-agent interactions.

8. The method of claim 1, wherein the predicted performance score for each feature in the new customer-agent interaction is generated using a classifier model, and further comprising:

associating the new customer-agent interaction with the corresponding one of the one or more task groups;

selecting, from the corresponding one of the one or more task groups, the task-feature performance value associated with the first agent;

comparing the predicted performance score for each feature in the new customer-agent interaction with the task-feature performance value for the corresponding one of the one or more task groups associated with the first agent;

determining, based on the comparison, whether the predicted performance score is within a range of the task-feature performance value for the corresponding one of the one or more task groups associated with the first agent; and outputting a second indication when the predicted performance score is outside and below the range.

9. The method of claim 8, wherein at least one of the indication or the second indication triggers an agent coaching process.

10. The method of claim 8, wherein the classifier model is selected from a plurality of classifier models based on a KPI selected by a client.

11. The method of claim 1, wherein updating the first narrative based on one or more modified hyperparameters of the large language model comprises:

iteratively modifying one or more hyperparameters of the large language model; and causing the large language model to implement the modified one or more hyperparameters and to generate an updated first narrative for the first intent.

12. The method of claim 1, wherein if the first confidence score fails to satisfy the threshold:

detecting a second intent, with a second large language model, from the interaction transcript and the engineered prompt of the customer-agent interaction;

generating, with the second large language model, a second narrative for the second intent and a second confidence score corresponding to a probability that the second intent is an intention in fact expressed in the interaction transcript; and outputting the second narrative as the task label based on a determination that the second narrative for the second intent conforms to the one or more fluency and completeness rules.

13. An apparatus configured for providing automated agent performance ranking, comprising: one or more memories comprising processor-executable instructions; and one or more processors configured to execute the processor-executable instructions and cause the apparatus to:

obtain, for each agent of a plurality of agents, a performance score for each feature associated with a plurality of customer-agent interactions, wherein each feature is associated with a key performance indicator (KPI) metric and is under control of the agent;

determine task labels for the plurality of customer-agent interactions, wherein a task label for a customer-agent interaction of the plurality of customer-agent interactions is determined by:

detect, with a large language model, a first intent from an interaction transcript and an engineered prompt of the customer-agent interaction;

generate, with the large language model, a first narrative for the first intent and a first confidence score corresponding to a probability that the first intent is an intention in fact expressed in the interaction transcript;

determine that the first confidence score satisfies a threshold;

verify that the first narrative conforms with one or more fluency and completeness rules based on a determination that the first confidence score satisfies the threshold;

update the first narrative based on one or more modified hyperparameters of the large language model when the first narrative does not conform with the one or more fluency and completeness rules;

output the first narrative as the task label for the customer-agent interaction, group the plurality of customer-agent interactions into one or more task groups based on the task label for each of the plurality of customer-agent interactions;

determine, for each agent of the plurality of agents, a task-feature performance value, wherein the task-feature performance value is a combination of the performance score for each feature associated with the one or more task groups;

obtain, for a first agent of the plurality of agents, a time series of the task-feature performance value for a corresponding one of the one or more task groups, determine that a predicted performance score for each feature in a new customer-agent interaction for the first agent indicates a decrease in performance based on a time series of the task-feature performance value for the corresponding one of the one or more task groups and the decrease in performance meets or exceeds a divergence threshold; and output an indication when the decrease in performance meets or exceeds the divergence threshold.

14. The apparatus of claim 13, wherein the one or more processors are configured to execute the processor-executable instructions and cause the apparatus to generate, for each agent of the plurality of agents, a time series of the performance scores for each feature associated with the plurality of customer-agent interactions; and wherein the step of grouping the plurality of customer-agent interactions into one or more task groups comprises grouping each of the generated time series into the one or more task groups based on the task label for each of the plurality of customer-agent interactions.

15. The apparatus of claim 14, wherein the one or more processors are configured to execute the processor-executable instructions and cause the apparatus to:

generate, for each feature associated with the plurality of customer-agent interaction, a report comprising a listing of high-ranking agents and a listing of low-ranking agents based on the task-feature performance value; and trigger, based on the report for each feature associated with the plurality of customer-agent interaction, an agent coaching process for one or more agents in the listing of low-ranking agents.

16. The apparatus of claim 15, wherein the report further comprises the time series of the performance score for each agent of the plurality of agents.

17. The apparatus of claim 13, wherein the one or more task groups are associated with at least one of a type of task or a task difficulty metric, and wherein the task difficulty metric may be generated from a predefined rating assigned to each type of task.

18. The apparatus of claim 13, wherein the step of obtaining the performance score for each feature associated with the plurality of customer-agent interactions comprises processing the plurality of customer-agent interactions with a model configured to measure performance of features in the plurality of customer-agent interactions.

19. The apparatus of claim 13, wherein the predicted performance score for each feature in the new customer-agent interaction is generated using a classifier model, and wherein the one or more processors are configured to execute the processor-executable instructions and cause the apparatus to:

associate the new customer-agent interaction with the corresponding one of the one or more task groups;

select, from the corresponding one of the one or more task groups, the task-feature performance value associated with the first agent;

compare the predicted performance score for each feature in the new customer-agent interaction with the task-feature performance value for the corresponding one of the one or more task groups associated with the first agent;

determine, based on the comparison, whether the predicted performance score is within a range of the task-feature performance value for the corresponding one of the one or more task groups associated with the first agent; and output a second indication when the predicted performance score is outside and below the range.

20. The apparatus of claim 19, wherein the classifier model is selected from a plurality of classifier models based on a KPI selected by a client.

21. The apparatus of claim 19, wherein the one or more processors are configured to execute the processor-executable instructions and cause the apparatus to trigger an agent coaching process based at least on one of the indication or the second indication.

22. The apparatus of claim 13, wherein if the first confidence score fails to satisfy the threshold, the one or more processors are configured to execute the processor-executable instructions and cause the apparatus to:

detect a second intent, with a second large language model, from the interaction transcript and the engineered prompt of the customer-agent interaction;

generate, with the second large language model, a second narrative for the second intent and a second confidence score corresponding to a probability that the second intent is an intention in fact expressed in the interaction transcript; and output the second narrative as the task label based on a determination that the second narrative for the second intent conforms to the one or more fluency and completeness rules.

* * * * *